Jan. 16, 1923.
W. C. POLK.
CONCRETE FORM.
FILED JULY 2, 1921.
1,442,294.
2 SHEETS—SHEET 1.
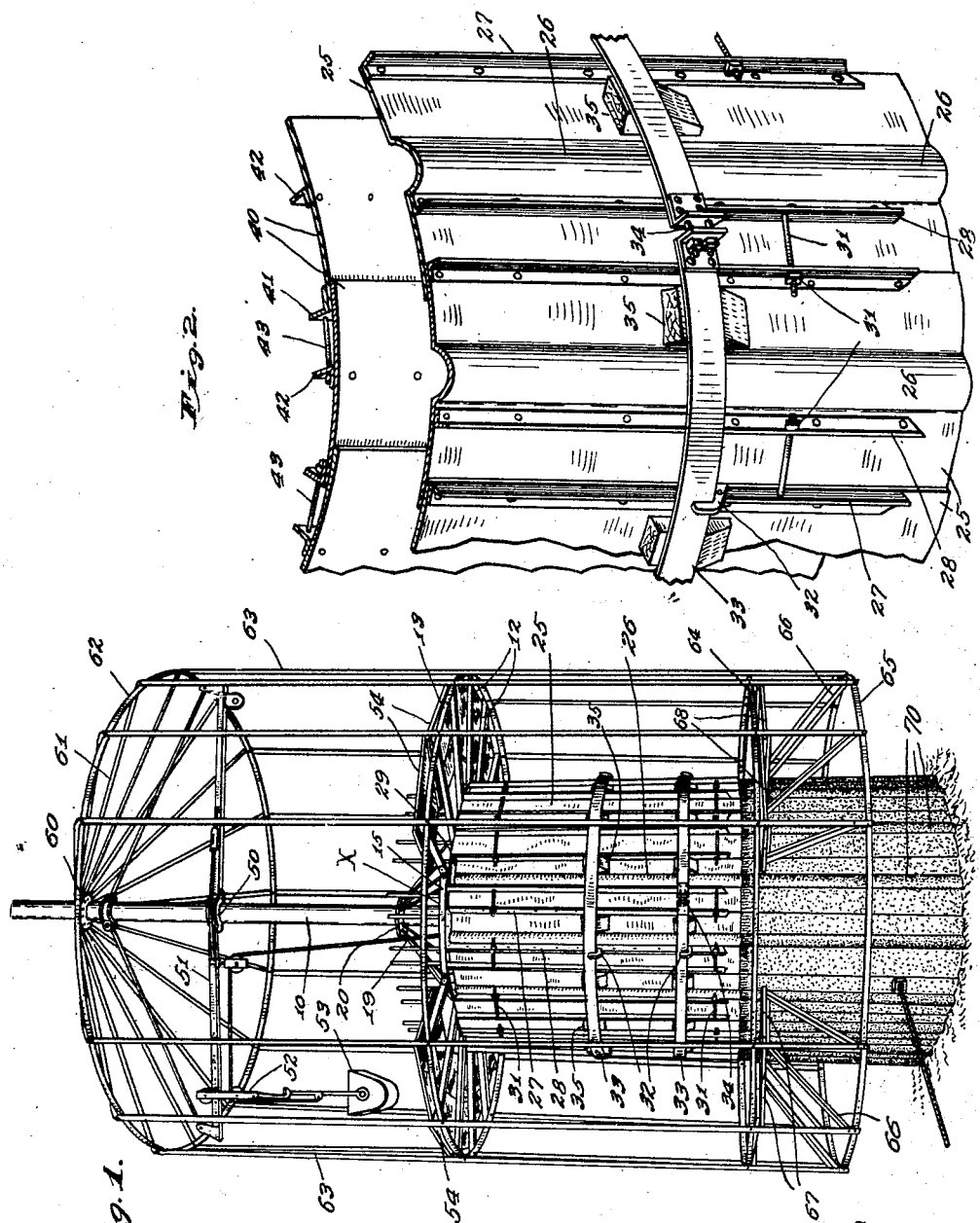
Inventor
Walter C. Polk,
By Hood & Schley
Attorneys

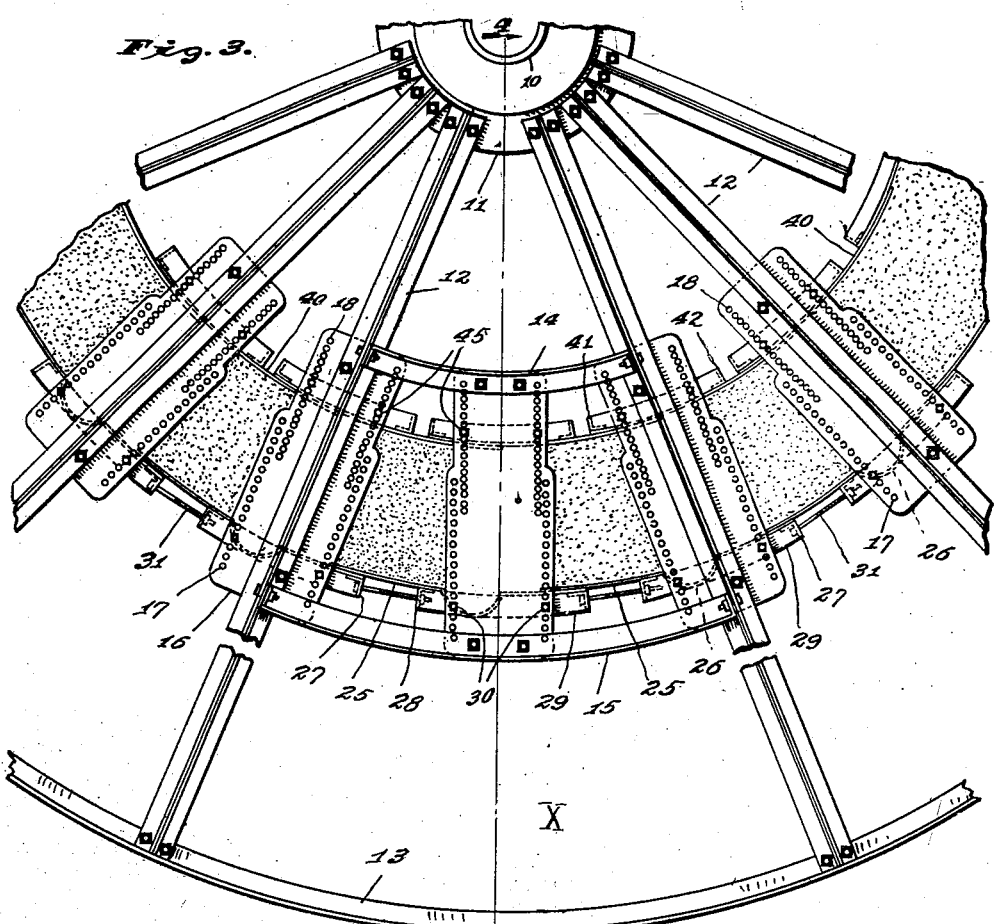

Patented Jan. 16, 1923.

1,442,294

UNITED STATES PATENT OFFICE.

WALTER C. POLK, OF INDIANAPOLIS, INDIANA.

CONCRETE FORM.

Application filed July 2, 1921. Serial No. 482,029.

*To all whom it may concern:*

Be it known that I, WALTER C. POLK, a citizen of the United States, residing at Indianapolis, in the county of Marion and State of Indiana, have invented new and useful Improvements in Concrete Forms, of which the following is a specification.

The object of my invention is to produce improvements in an apparatus of general type shown in my Patent Number 1,225,356, dated May 8, 1917, for fabricating circular concrete structures, particularly those which are tapered, such for instance as chimneys.

The accompanying drawings illustrate my invention. Fig. 1 is a perspective view of the apparatus; Fig. 2 a fragmentary perspective of portions of the inner and outer forms; Fig. 3 a fragmentary plan and Fig. 4 a fragmentary vertical section.

In the drawings, 10 indicates a mast upon which is mounted a vertically movable collar 11 provided with a series of radiating arms 12 connected at their outer ends by ring 13. At one point, for a purpose which will appear, one of the arms 12 is omitted and the gap bridged by arc shaped bars 14 and 15. Secured to each arm 12, and bridging the space between bars 14 and 15 are plates 16 provided with two sets of spaced perforations 17 and 18. The arms 12 are braced by diagonal rods 19 connected at their upper ends to the collar 20, sleeved upon mast 10.

The outer cylindrical form is composed of a circumferential series of overlapping narrow vertical arc shaped plates 25, each provided along one edge with a stiffening flange 27 conveniently formed of angle iron. Midway in its width, each plate 25 is formed into a hollow longitudinal rib 26 and adjacent this rib, preferably upon the side more remote from the angle iron 27, is a stiffening rib 28. At its upper end the hollow rib 26 is cut away in order to permit an angle iron 29 to be secured to the upper end of plate 25 from rib 27 to rib 28, this angle iron being bent to an arc shape having a radius approximating the maximum radius of the desired form, the angle iron being arranged to present an outwardly directed horizontal flange which may be secured to a plate 16 by bolts 30 entering any one of the series of perforations 17. Each rib 28 is connected to the rib 27 of an adjacent plate 25 by means of bolts 31 provided with nuts 31', bolts 31 being threaded to permit a variation of spacing, and a consequent variation of overlapping of adjacent plates 25. Some of the ribs 27 are provided with upwardly presented hooks 32 adapted to support a binding strap 33, which may be tightened by means of bolts 34, blocks 35 being placed within the band so as to engage plates 25.

The inner form is produced by a circumferential series of narrow arc shaped plates 40 stiffened at one edge by a longitudinal rib 41 and, at an intermediate point, by a longitudinal rib 42. The plates 40 are arc shaped upon a radius somewhat less than the radius of plates 25 and are overlapped as shown in Fig. 2, being connected by bolts 43 which extend from one rib 41 to the rib 42 of the adjacent plate. At the upper end each plate 40 is stiffened by a transverse angle iron 44 which extends between the ribs 41 and 42 and is secured to any plate 16 by means of bolts 45 inserted in any pair of perforations 18.

The perforations 18 are spaced from each other somewhat closer than are perforations 17, the arrangement being such that, as plates 25 and 40 are successively shifted inwardly toward mast 10, the distance between adjacent plates 25 and 40 will become successively less so that in the production of a tapered structure, the thickness of the wall may be decreased as the internal and external diameters decrease.

Supported upon the mast 10, is a vertical shiftable collar 50 supporting a cross arm 51, upon one end of which is mounted a trolley carriage 52 supporting an elevator bucket 53 which may be raised and lowered through the space X (Fig. 3). The arms 12 form supports for foot boards 54 which serve as a working platform.

Vertically adjustable upon mast 10 is a collar 60 supporting a series of outwardly and downwardly radiating arms 61 connected at their outer ends by a ring 62 of approximately the diameter of ring 13, and secured to said rings 62 and 13 is a circumferential series of vertical suspension rods 63, which are extended considerably below ring 13 and connected by rings 64 and 65. Projecting upwardly and inwardly from ring 65 is a circumferential series of brace bars 66 connected at their upper ends with cross bars 67 forming a support for foot boards 68 which form a working platform about seven feet below the platform 54. The vertical suspension rods 63 and the super-structure 62—61 form a housing upon which may be placed a canvas cover which will entirely encase the apparatus and, when drawn in at its lower edge below ring 62 will serve as a housing which will permit work to be carried on during freezing weather. This encasing canvas is also useful when carrying on construction at high elevations in windy weather.

The initial curvatures of plate 25 approximate the curvature of the largest diameter article to be produced, while the initial curvature of plates 40 approximate the curvature of the smallest diameter article to be produced. Each of the plates 25 and 40 has a free edge capable of sufficient lateral distortion to permit its being brought into approximation with the various curves to be produced and the plates thus coordinate to produce a substantially circular article. There is, however, in the finished article, a ridge or off-set formed at each overlap and this would become very apparent to the observer were it not for the effect the vertical ribs 70 produced in the finished article by reason of hollow ribs 26 of the form plates 25, but these ribs 70 break up the external surface of the article to such an extent as to practically obliterate the least pronounced variations.

I claim as my invention:

1. The combination with a mast, of a frame vertically movable on said mast and provided with a plurality of radiating arms, a form carrying plate carried by each of said arms, a circumferenial series of overlapping external form plates adjustably attachable to said form carrying plates, a circumferential series of overlapping internal form plates, and means for adjustably connecting said internal form plates with the form carrying plates.

2. The combination with a mast, of a frame vertically movable on said mast and provided with a plurality of radiating arms, a form carrying plate carried by each of said arms, a circumferential series of overlapping external form plates adjustably attachable to said form carrying plates, a circumferential series of overlapping internal form plates, and means for adjustably connecting said internal form plates with the form carrying plates, a pair of vertical stiffening ribs carried by said form plates, one of each pair of ribs being arranged at an intermediate point in the width of its plate, adjustable connections between adjacent ribs of adjacent plates.

3. The combination with a mast, of a frame vertically movable on said mast and provided with a plurality of radiating arms, a form carrying plate carried by each of said arms, a circumferential series of overlapping external form plates adjustably attachable to said form carrying plates, a circumferential series of overlapping internal form plates, and means for adjustably connecting said internal form plates with the form carrying plates, a pair of vertical stiffening ribs carried by said form plates, one of each pair of ribs being arranged at an intermediate point in the width of its plate, adjustable connections between adjacent ribs of adjacent plates, and clamping means externally embracing the external form plates.

4. An external form for casting concrete comprising a circumferential series of overlapping plates bent to form an intermediate longitudinal hollow rib.

5. The combination with a mast, a work platform vertically adjustable upon said mast, a pair of co-related concentric forms supported from said mast, and a cover supporting frame vertically adjustable upon said mast.

6. The combination with a mast, of a series of radiating suspension rods vertically adjustable upon said mast, a circumferential series of suspension rods supported thereby, a work platform supported by said suspension rods and upon said mast, and forms supported by said frame work.

In witness whereof, I have hereunto set my hand at Indianapolis, Indiana, this twenty-eighth day of April, A. D. one thousand nine hundred and twenty-one.

WALTER C. POLK.